(12) United States Patent
Cunningham et al.

(10) Patent No.: US 11,632,443 B2
(45) Date of Patent: Apr. 18, 2023

(54) PROVIDING MULTIPLE TCP CONNECTIONS BETWEEN A CLIENT AND SERVER

(71) Applicant: Connectify, Inc., Philadelphia, PA (US)

(72) Inventors: Kevin Cunningham, Swarthmore, PA (US); Harry Volek, Philadelphia, PA (US); Brian Prodoehl, Plymouth Meeting, PA (US); Alexander Gizis, Philadelphia, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

(21) Appl. No.: 17/499,833

(22) Filed: Oct. 12, 2021

(65) Prior Publication Data

US 2022/0116484 A1 Apr. 14, 2022

Related U.S. Application Data

(60) Provisional application No. 63/091,369, filed on Oct. 14, 2020.

(51) Int. Cl.
| | |
|---|---|
| H04L 69/14 | (2022.01) |
| H04L 69/165 | (2022.01) |
| H04L 67/143 | (2022.01) |
| H04L 43/08 | (2022.01) |
| H04L 43/16 | (2022.01) |
| H04L 67/141 | (2022.01) |

(52) U.S. Cl.
CPC .............. *H04L 69/14* (2013.01); *H04L 43/08* (2013.01); *H04L 43/16* (2013.01); *H04L 67/141* (2013.01); *H04L 67/143* (2013.01); *H04L 69/165* (2013.01)

(58) Field of Classification Search
CPC ......... H04L 69/14; H04L 43/08; H04L 43/16; H04L 67/141; H04L 67/143; H04L 69/165; H04L 12/4633; H04L 12/4641; H04L 61/4511; H04L 69/22; H04L 69/161; H04L 45/24
See application file for complete search history.

(56) References Cited

U.S. PATENT DOCUMENTS

| | | | | |
|---|---|---|---|---|
| 2012/0005276 | A1* | 1/2012 | Guo | H04L 67/5651 709/206 |
| 2014/0258461 | A1* | 9/2014 | L'Heureux | H04L 63/0464 709/219 |
| 2019/0312815 | A1* | 10/2019 | Altman | H04W 28/0231 |
| 2021/0235521 | A1* | 7/2021 | Sung | H04L 67/146 |

* cited by examiner

*Primary Examiner* — Charles C Jiang
*Assistant Examiner* — Shawn D Miller

(57) ABSTRACT

One example may include a process that includes establishing a first transmission control protocol (TCP) connection between a client device and a server to form a virtual private network (VPN), permitting communication between the client device and the server on the first TCP connection, monitoring communication over the first TCP connection to identify one or more connection parameters, and establishing a second TCP connection between the client device and the server when the one or more connection parameters indicate a slowing of the first TCP connection below a threshold and below a previously measured connection rate.

14 Claims, 7 Drawing Sheets

PROVIDING MULTIPLE TCP CONNECTIONS BETWEEN A CLIENT AND SERVER

CROSS-REFERENCE TO RELATED APPLICATION

The present invention claims priority to U.S. provisional application No. 63/091,369, entitled "METHOD AND APPARATUS FOR MULTIPLE TCP CONNECTIONS," which was filed on Oct. 14, 2020, the entire contents of which is hereby incorporated by reference in its entirety.

BACKGROUND

Computers can communicate with one another when connected together using some form of communications (such as a network). The Internet is one such network, which has grown extensively over the past few decades, and has the distinct advantage of being able to connect computers together from anywhere in the world. Another type of communications network is a local area network ("LAN"), which is a private network that typically exists between only a few trusted computers, usually in an office or home. A further example of a computer communications network is a wide area network ("WAN"), which is usually used for communications access to the Internet via a wireless radio protocol.

There are many possible reasons to want remote computers to join a LAN. A LAN itself is often secure, it may contain or have access to important corporate resources at the office, or access to one's personal media or data files in a residential setting. However, once a user device attaches to a LAN via a direct Internet connection, the LAN is no longer secure. For this reason, the Virtual Private Network ("VPN") was created. The VPN is software that appears to be another LAN adapter, but uses encryption technology and methods, and Internet connections, to bridge remote computers onto a local area network, without risk of directly connecting the LAN to the public and insecure Internet.

FIG. 1 illustrates a conventional Virtual Private Network 100. In such a network, predefined or rolling algorithms permit a secure connection between a computer (client device) 102 and a remote server 160. This connection is made over any network 140, which may also be the Internet, with security managed by the VPN layer on the VPN server 150. Any software applications 110 on the client computer 102 will observe the VPN layer as VPN client 120, appearing no different than the driver 121 for a physical network interface. The VPN client 120 encapsulates 122 all traffic sent to it (in some cases as encrypted, private data), and then sends it via a standard network interface and driver to a physical network interface device, such as a Wi-Fi or Ethernet device. From there, the data may travel to Internet 140 via LAN 130 and ISP 135.

A single ISP is shown handling both cellular access and a LAN, although this is merely exemplary. For example, respectively different ISPs may be used for cellular access and the LAN. The VPN data may be secure over the Internet 140 using encryption, and is subsequently sent to VPN server 150. VPN server 150 may decapsulate (e.g., decrypt) the data received from the VPN client via decapsulate/encapsulate module 152 before sending the decrypted data to remote server 160. Remote server 160 may transmit a response to VPN server 150, which may be encrypted and sent to computer device 102 and that data is decrypted before being provided to the device 102.

In operation, client 110 communicates over Internet 140 with multiple servers, including server 160. VPN server 150 may provide client device 102 with streaming content while another server may provide client device 102 with non-streaming content, such as the download of a static webpage. Client device 102 transmits requests for data from server 160 via optional LAN 130, ISP 135 and Internet 140. Server 160 (and other servers) respond to data requests via Internet 140.

Communication via the Internet 140 typically occurs via the Open Systems Interconnection model (OSI model), which is a conceptual model that standardizes communication functions in a telecommunications or computing system. Layer 3 of the OSI model—the Network Layer—provides the functional and procedural transfer of data sequences from node to node within a network. For example, the Internet Protocol (IP) is a networking layer protocol that enables packets to be routed or switched within an IP network. Layer 4 of the OSI model—the Transport Layer—provides the functional and procedural transfer of data sequences from source to destination.

The Transport Layer is one layer in a layered architecture of protocols. Exemplary protocol layer architectures include the Internet protocol suite and the OSI model. The Transport Layer accepts data, splits it into smaller units such as packets, enables transport of those units, and reassembles the units at their destination. The Transport Layer thus provides end-to-end communication, which can also be described as providing data transfer between applications. Thus, the Transport Layer permits application-oriented communication independently of network characteristics by transferring packets from source to destination. Transport Layer protocols are known, including ATP, DCCP, RDP, SPX, TCP and UDP, as some examples.

TCP and UDP are two common examples of Transport Layer protocols that are well known in the art of computer networking. Each protocol controls packet flow between source point and destination point. Each type of Transport Layer protocol (e.g. TCP, UDP, etc.) has advantages and disadvantages that effect their suitability for certain types of data transmissions.

The use of TCP and UDP are now described as examples. TCP is a connection-based protocol. Communication via TCP begins with a three-way handshake as follows: Source sends SYN to Destination, Destination responds by sending SYN-ACK to Source, Source responds by sending ACK to Destination. In this manner a connection is established between Source and Destination (which is why TCP is described as a connection-oriented protocol). Data transmission between Source and Destination then begins.

By using a windowing system, TCP sends the receiver (Destination) a group of packets. The receiver performs a data validity check and then sends an ACK (acknowledge) or NAK (not-acknowledge) back to the transmitter (Source). The next group of packets in the sequence is sent if an ACK is received. The original group of packets are resent if the transmitter receives a NAK or if the transmitter times out.

TCP header size is 20 bytes. Common TCP header fields include Source port, Destination port, and Check Sum. Additional fields include Sequence Number and Ack Number. A reserved header field 6 (all zeros) is also included.

The advantage of the above mechanism is that TCP can confirm that a block of data (such as the contents of a file) was received by a Destination (or determine that some or all of the data was not received by the Destination). TCP is useful when accurate transmission (and reception) of data packets is required/desired. TCP has become the dominant protocol for Internet connectivity, because of its ability to partition into individual packets large sets of data, check for and resend lost packets, and reassemble packets in correct sequence. All of these attributes are significant advantages. There is, however, a cost: use of TCP results in overhead and delays (latency). If one or more packets are received at a remote access point with error(s), packet delivery may be delayed at the Destination until the error is corrected.

TCP has also been known to suffer with another weakness: when TCP is implemented, there is an equal sensitivity to random loss and congestion loss, and discrimination between the two may not occur. In other words, sporadic losses due to radio channel problems may be misinterpreted as a symptom of congestion. As a consequence, network devices may react to loss by reducing the transmission (congestion) window, and thus the sender transmission rate. The exact behavior may vary depending on the particular congestion control algorithm being used, but it is known in the art that a large reduction in overall speed may occur responsive to packet loss. Some congestion control algorithms may be less susceptible to this issue, but when TCP is used, it is an issue nonetheless. For example, in such a situation, a better strategy might be to not decrease retransmission rate.

UDP is a connectionless protocol. Communication via UDP (typically) does not include handshaking (enhancements to UDP may include handshaking). One program sends multiple packets to another program and the relationship between the two programs (typically) ends.

UDP header size is 8 bytes. There are four UDP header fields that are two bytes each: Source port (port number of the sender), Destination port (port number the data is addressed to), length (length in bytes of the UDP header and any encapsulated data); and Checksum (used for error checking). The use of the Checksum and Source port fields are optional in IPv4. In IPv6, the Source port field is optional. A "pseudo header" is used for UDP checksum calculation.

UDP is useful when lack of perceived latency is critical, such as gaming, voice and video communication. Latency when perceived in such situations has an adverse effect. Often in these applications, some data loss can occur without adversely affecting perceived quality. Furthermore, in some situations, forward error correction can be used to improve audio/video quality despite some losses. In these types of situations, getting data to its destination in a timely manner takes priority over getting data to its destination without error. If a voice transmission, for example, is delivered at its destination (during a conversation) with a few errors, the transmission will often be intelligible. But, if the user at the Destination needs to wait for errors to be corrected before the transmission is delivered, then the delay (while the errors are being corrected) may adversely affect the quality of the conversation.

UDP is also useful when applications have their own methods of responding to packets. For example, users can decide themselves when to respond to information that is incorrect. To summarize, here are some of the characteristics of TCP: Connection-oriented protocol, most widely used protocol on the Internet, confirm whether all data reaches the intended recipient, ability to resend lost data, sends packets in order, slower than UDP and requires more resources than UDP, bigger header than UDP, preferable to use when high reliability is desired, and transmission time is less critical.

To summarize, here are some of the characteristics of UDP: connectionless protocol, useful for video streaming and VoIP, Faster than TCP and requires fewer resources, packets may not arrive at destination in order, sender does not know whether a packet has been received, better suited for applications that need timely data reception.

SUMMARY

One example embodiment may include a method of transmitting data between a client and a server via a VPN, the method may include the operations of establishing a first TCP connection between the client and the server via a network access point, permitting communication between the client and the server on the first TCP connection via the network access point; monitoring the communication with regard to a parameter associated with the communication to obtain a measured value, and adding a further TCP connection between the client and the server via the network access point if the measured value does not cross a threshold amount.

Another example embodiment may include a method that includes establishing a first transmission control protocol (TCP) connection between a client device and a server to form a virtual private network (VPN), permitting communication between the client device and the server on the first TCP connection, monitoring communication over the first TCP connection to identify one or more connection parameters, and establishing a second TCP connection between the client device and the server when the one or more connection parameters indicate a slowing of the first TCP connection below a threshold and below a previously measured connection rate.

Another example embodiment may include an apparatus that includes a processor configured to establish a first transmission control protocol (TCP) connection between a client device and a server to form a virtual private network (VPN), permit communication between the client device and the server on the first TCP connection, monitor communication over the first TCP connection to identify one or more connection parameters, and establish a second TCP connection between the client device and the server when the one or more connection parameters indicate a slowing of the first TCP connection below a threshold and below a previously measured connection rate.

Still another example embodiment may include a non-transitory computer readable storage medium configured to store instructions that when executed cause a processor to perform establishing a first transmission control protocol (TCP) connection between a client device and a server to form a virtual private network (VPN), permitting communication between the client device and the server on the first TCP connection, monitoring communication over the first TCP connection to identify one or more connection parameters, and establishing a second TCP connection between the client device and the server when the one or more connection parameters indicate a slowing of the first TCP connection below a threshold and below a previously measured connection rate.

DETAILED DESCRIPTION

Figure 1:
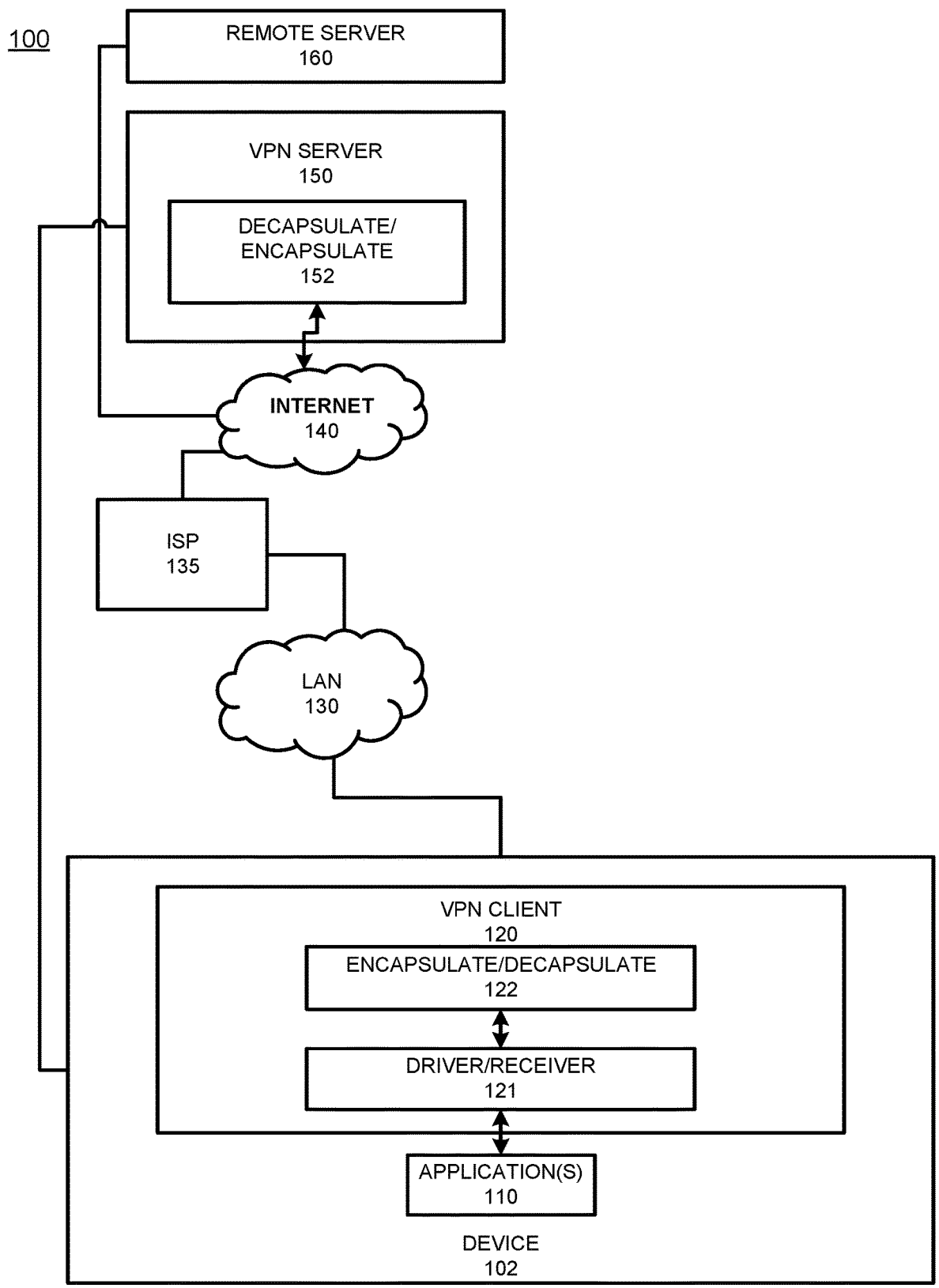
FIG. 1 is a block diagram of a communication system that communicates with a VPN server in accordance with a conventional VPN.
Figure 2:
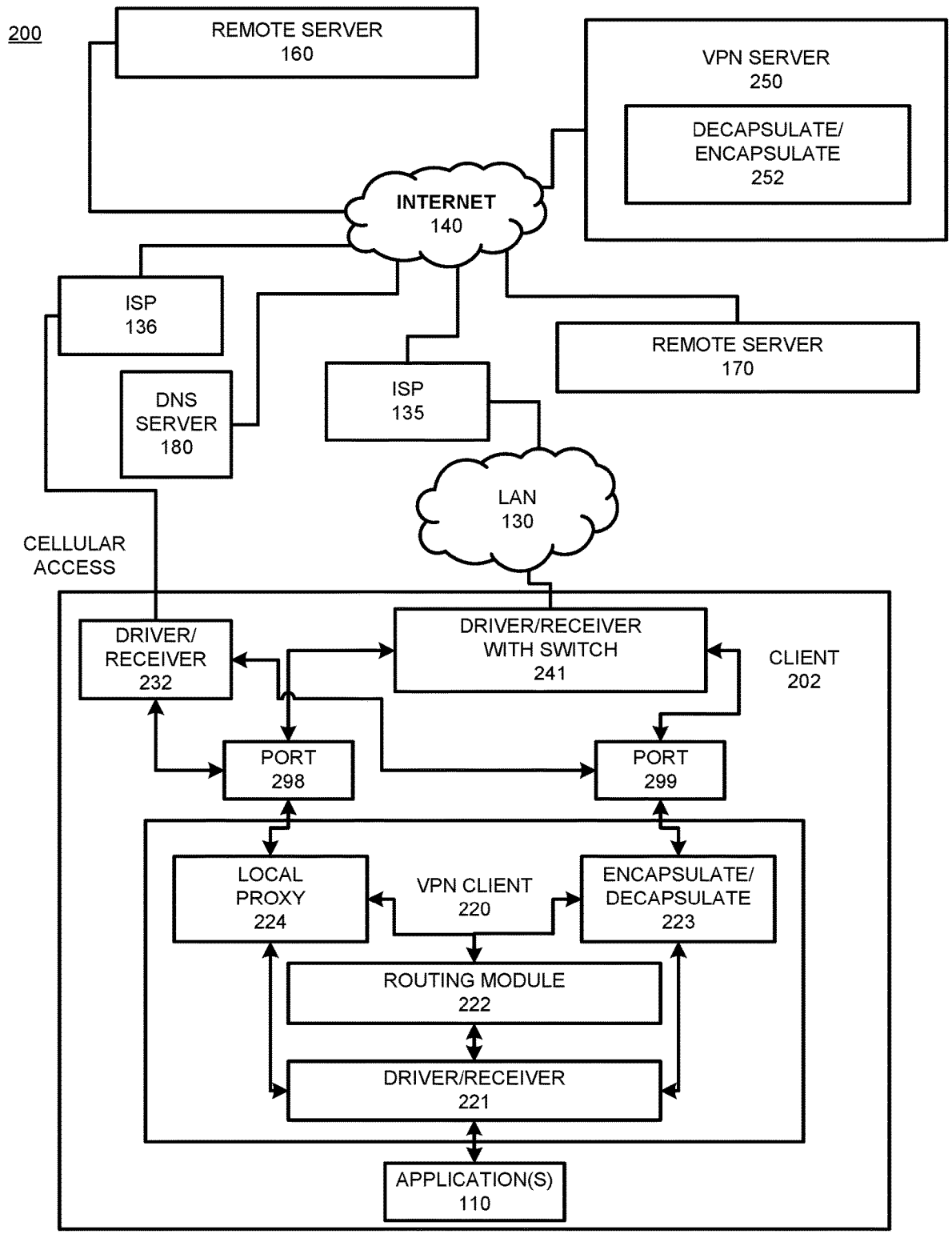
FIG. 2 is a block diagram of a communication system that communicates with a VPN server according to exemplary embodiments of the present invention.

FIG. 2 is a block diagram that illustrates communication system 200 in accordance with one or more exemplary embodiments of the present invention.

Generally speaking, communication system 100 includes client 102 and remote server 160. Client device 202 may be, for example, a mobile communications device. Remote server 160 is a source of data that may be desired by client device 202. Remote server 160 may be any source of data. In one or more exemplary embodiments of the present invention, remote server 160 is a source of video streaming. Various video streaming providers that provide video streaming services are known. Thus, in one example, client device or 'client' 202 desires to receive video content from a video streaming provider.

Communication system 200 further includes a virtual private network (VPN). In addition to client 102 communicating with remote server 160, client 102 also wishes to communicate with a source of data via a VPN. The VPN, for example, provides data encapsulation (which may or may not include data encryption via encapsulate/decapsulate module 122). One exemplary use of a VPN is to provide secure, encrypted data. Thus, client 102 wishes to communicate with remote server 160 as well as to communicate over a VPN.

The above objective, to communicate with remote server 160 as well as to communicate over a VPN 250 may take several forms. In one form, communication with remote server 160 is outside of the VPN 250, while further communication takes place with the VPN. The communication that takes place with the VPN 250 may be with remote server 160 or with another remote server 170. In another example, communication with remote server 160 may be over a VPN while additional communication occurs with a VPN (the same VPN that is communicating with remote server 160 or different VPN). In the explanation set forth below, communication with remote server 160 is outside of a VPN while communication to remote server 160 or to additional remote server 170 occurs with a VPN, but this is merely an example.

FIG. 2 illustrates a client device 202 communicating with the network via a VPN client 220. Initially, FIG. 2 illustrates that client 202 is attempting to communicate with remote server 160. As shown, client 202 may be, for example, a mobile communications device that wirelessly communicates with network 135 via one or more access points (that may include Ethernet, modem, cellular, Wi-Fi, etc.). ISP 135 and ISP 136 may each permit public access or restricted access. As an example, ISP 135 may include a communications network that is typically accessed over a wired connection, while ISP 136 may include a communications network that is accessed by cellular communications provider. Alternatively, or in addition, an ISP may be provided that permits both forms of communication and perhaps another form of communication. ISP 135 and ISP 136 are shown coupled to Internet 140 through communication protocols that are well known to one of ordinary skill in the art. In one example, ISP 135 and ISP 136 interface with Internet 140 via a fiber-optic or Ethernet Internet connection.

While in one example ISP 136 is accessed by a cellular access point, ISP 136 may be accessed via other methods alternatively or as well, such as a LAN (e.g., a wireless home network), a combination of wired and/or wireless connections, and perhaps one or more intervening networks (such as a wide area network) so that access to Internet 140 may be obtained.

In the example above, a user may use client 202 for voice communication. Assume client 202 is a cell phone such as a smartphone, and communication occurs via a Voice over IP (VoIP) application. Client application 110 communicates with ISP 135, ISP 136, or both (alternatively or simultaneously using technology such as channel bonding) via one or more access points and a digitized form of the user's voice is then transmitted to Internet 140. From Internet 140, the data that represents the user's voice is transmitted to remote server 170. From remote server 170, the data may be transmitted to another user (not shown) so that voice communication between the two users may occur.

In another embodiment, a user may use client device 202 for secure voice communication. Data from application(s) 110 enters VPN client 220 via driver/receiver 221. Voice communication data is encapsulated (which may or may not include encryption) via encapsulate/decapsulate (encap/decap) module 223. Encapsulated data is then transmitted to ISP 135 (and/or ISP 136) via one or more access points before reaching Internet 140. From Internet 140, the encapsulated data (i.e., the encapsulated voice communication data) is transmitted to VPN server 250. Data is then decapsulated (which may or may not include decryption) via decapsulate/encapsulate (decap/encap) module 252 before being retransmitted to Internet 140 and remote server 170. From remote server 170, the data may be transmitted to another user (not shown) so that voice communication between two users may occur via a VPN.

In another embodiment, client 202 streams video data from remote server 160. Client 202 requests the video data from remote server 160 by transmitting a request through ISP 135 (and/or ISP 136) and Internet 140. Remote server 160 responds to the request by transmitting video via Internet 140, and back to ISP 135 (and/or ISP 136), so that it is eventually received by client 202. Such video streaming may occur outside of the VPN 250. The request to stream data may or may not be proceeded by a DNS request to provide the IP address of remote server 160. The DNS request can be received and processed by DNS server 180.

In yet another example, remote server 160 serves two purposes: first, it is used as the source of streaming data (inside or outside a VPN) and second, it is used in combination with data that has been transmitted via the VPN.

In another example, data is transmitted via VPN 250, and further data is transmitted outside of the VPN (or outside of the VPN on another VPN). The data may be transmitted to at least two different servers (a remote server and VPN server). Alternatively, the data transmitted via the VPN and outside of the VPN (or outside on another VPN) may be transmitted to the same server.

In the above description, when the phrase "outside of the VPN" is used, this may include non-encapsulated/unencrypted data (i.e., data not encapsulated/encrypted by a VPN) and/or encapsulated/encrypted data that has been encapsulated/encrypted by another VPN.

Referring again to FIG. 2, application(s) 110 participate in communications that include Internet 140. In particular, application(s) 110 participate in communications that include VPN client 220. At least one type of communication that includes VPN client 220 also includes encapsulation/encryption. At least another type of communication that includes VPN client 220 omits encapsulation/encryption (at least by VPN client 220).

First, a description is provided of communication that includes VPN client 220 and that omits encapsulation/encryption (at least by VPN client 220).

VPN client 220 includes driver (driver/receiver) 221 that receives data from one or more applications 110. Driver 221 may be, for example, a TUN/TAP driver.

A request for data (such as a request for data streaming) to be returned to application 110 (or the act of providing data) is transmitted from driver 221 and is received by routing module 222. The purpose of routing module 222 is to determine whether the request for data will be encapsulated (for purposes of being transmitted via the VPN) or whether the request for data will be transmitted to local proxy 224 and not encapsulated (at least within VPN client 220). In addition, when the request for data that is transmitted via the VPN arrives at its destination, the destination is advised that the source of the data was a VPN server (and not the actual source of the data) because the destination receives the IP address of the VPN server as the source, and client 202 (the actual source of the data) may be hidden to the destination as the destination will only "identify" the IP address associated with the VPN server 250. By contrast, when a request for data that is not transmitted via the VPN arrives at its destination, the destinations identifies that the source of the data was client 202.

Among other things, when the request for data (or data, itself) has been received by routing module 222, routing module 222 directs the request in one of two separate directions depending upon user selection.

The first scenario to be described is with a VPN enabled. When a VPN is enabled, routing module 222 routes the request for data to VPN server 250 via encap/decap module 223. From VPN server 250, the request for data is further forwarded depending on whether or not the request for data is a DNS request. If the request for data is a DNS request, VPN server 250 routes the request to DNS server 180 (because the IP address of the DNS server is in the packet header as the destination). If the request for data is a data (non-DNS) request, VPN server 250 routes the request to remote server 160 (when the IP address of remote server 160 is in the packet header as the destination). If the request is received by DNS server 180, DNS server 180 resolves the DNS request and transmits the corresponding IP address to VPN server 250. VPN server 250 then transmits the IP address via switch 241 and port 299 to encap/decap 223. The IP address is subsequently transmitted to driver/receiver 221 and back to application 110 that initiated the DNS request. If the request is received by remote server 160, remote server 160 responds to the request by transmitting data (e.g., streaming data) via switch 241 and port 298 to local proxy 224. The data is subsequently transmitted to driver receiver 221 and back to application 110 that initiated the data request. The cellular access may be performed by driver/receiver 232.

The above explanation has been with regard to the transfer of data between client and server via a single TCP stream. In a further exemplary embodiment of the present invention, data is transferred between the client and the server(s) over multiple TCP streams, and data transfer on multiple streams may occur concurrently. By creating multiple TCP streams, multiple scenarios may be achieved. For example, the use of multiple TCP streams permits for a more consistent transmission rate to be obtained by enabling transmission and receiving procedures which utilize more than one TCP stream. As a further example, if packets are dropped while transmitting on a TCP stream, a TCP congestion control procedure may slow TCP transmission on a single TCP stream from a first rate to a new rate that is slower than the first rate, even if the cause of the problem is unrelated to congestion. By creating multiple TCP connections, while one TCP transmission stream may slow down (due to the congestion management procedure), the existence of one or more further TCP connections will lessen the total impact of the single slow TCP transmission.

Figure 3:
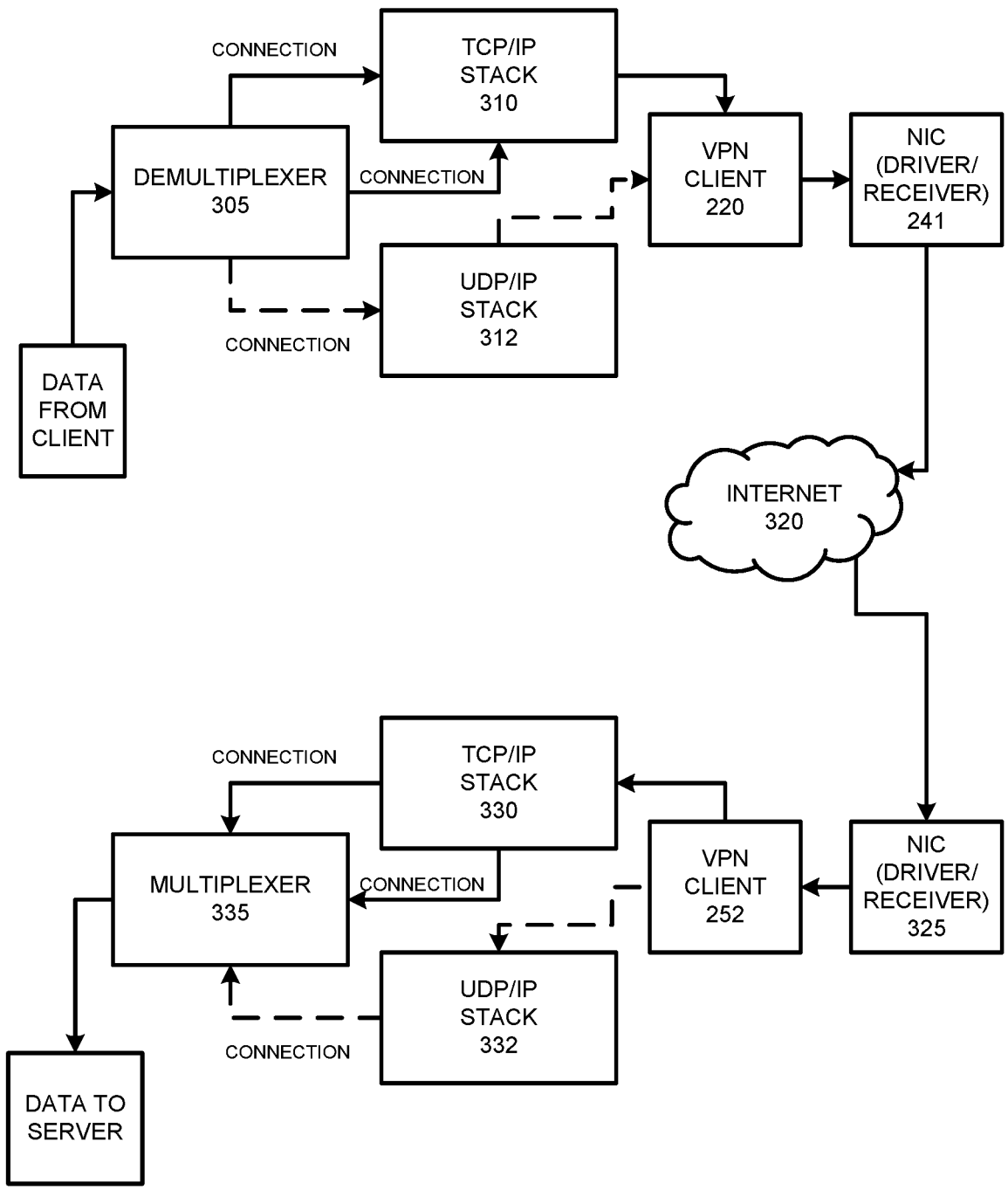
FIG. 3 is a block diagram that illustrates a communication system that communicates via multiple connections in accordance with an exemplary embodiment of the present invention.

Data leaving a client application 110 is received by demultiplexer 305 in FIG. 3. Demultiplexer 305 separates the data into multiple streams, and then passes the data to TCP/IP stack 310. TCP/IP stack 310 assigns a different respective source port to each of the multiple streams it receives and transmits via multiple TCP connections to VPN client 220. Data to be transmitted to remote server 160 (FIG. 2) via VPN 250 is encapsulated by encap/decap 223 (FIG. 2). Data to be transmitted to remote server 160 (FIG. 2) outside of a VPN is transmitted to remote server 160 via local proxy 224. Data proceeds through driver/receiver 241 (included in a NIC) and is transmitted to ISP 136, ISP 140, etc. (depending upon the port selected by VPN client 220). Data within the VPN is transmitted to server 160 via VPN server 250. Data outside the VPN is transmitted to server 160 without going through a VPN server. The data is communicated across the Internet 320.

FIG. 3 also illustrates NIC 325, VPN client 252, TCP/IP stack 330 and multiplexer 335. NIC 325, VPN client 252, TCP/IP stack 330 and multiplexer 335, which is situated at the location where data is transmitted through the TCP/IP stack 330 at the receiving end of the data communication. This operation may take place in VPN server 250 or remote server 160. Decoded data obtained by VPN server 250 may be re-encoded and passed to remote server 160. Decoded data obtained by remote server 160 may be used to access data on remote server 160, which in turn is transmitted back to application(s) 110.

Data on multiple TCP connections is thus received by NIC 325 (with a driver/receiver) and is decapsulated before being forwarded to remote server 160. Data on multiple TCP connections that is transmitted towards remote server 160 (without going through a VPN) is decoded and remote server 160 issues an appropriate response. Because each TCP connection is formed with a respectively different source port, data transmitted back to the client can be directed to the source port from which the data was transmitted.

The above explanation has described the formation of multiple TCP connections, but it is also possible to form a UDP connection concurrently with multiple TCP connections. Depending upon numerous factors (for example, the type(s) of data being transmitted, the type(s) of application(s) using the data, etc.), a UDP connection may have certain advantages over a TCP connection. For this purpose, optional UPD/IP stacks 312, 332 are illustrated in FIG. 3. Thus, it may be desirable for data to be transmitted over a UDP connection concurrently with data transmission over multiple TCP connections. Also, the UDP connection may transmit data as an independent channel managing UDP traffic for UDP specific applications.

In order to use multiple TCP connections, multiple TCP sockets are created. As is known to one of ordinary skill in the art, the definition of a TCP socket is: (source IP, source port, destination IP, destination port). Thus, in accordance with an exemplary embodiment of the present invention, in order to create multiple TCP sockets, the client operating system creates TCP sockets with respectively different source port numbers on the client for each socket. The destination (server) port number is specified when each connection is created. By creating sockets with respectively different source port numbers, it is possible to differentiate between the multiple TCP connections. In other words, when the operating system creates each socket, and when packets are read from and written to each socket, the operating system remembers the combination of the four socket attributes in order to differentiate between sockets.

Figure 4:
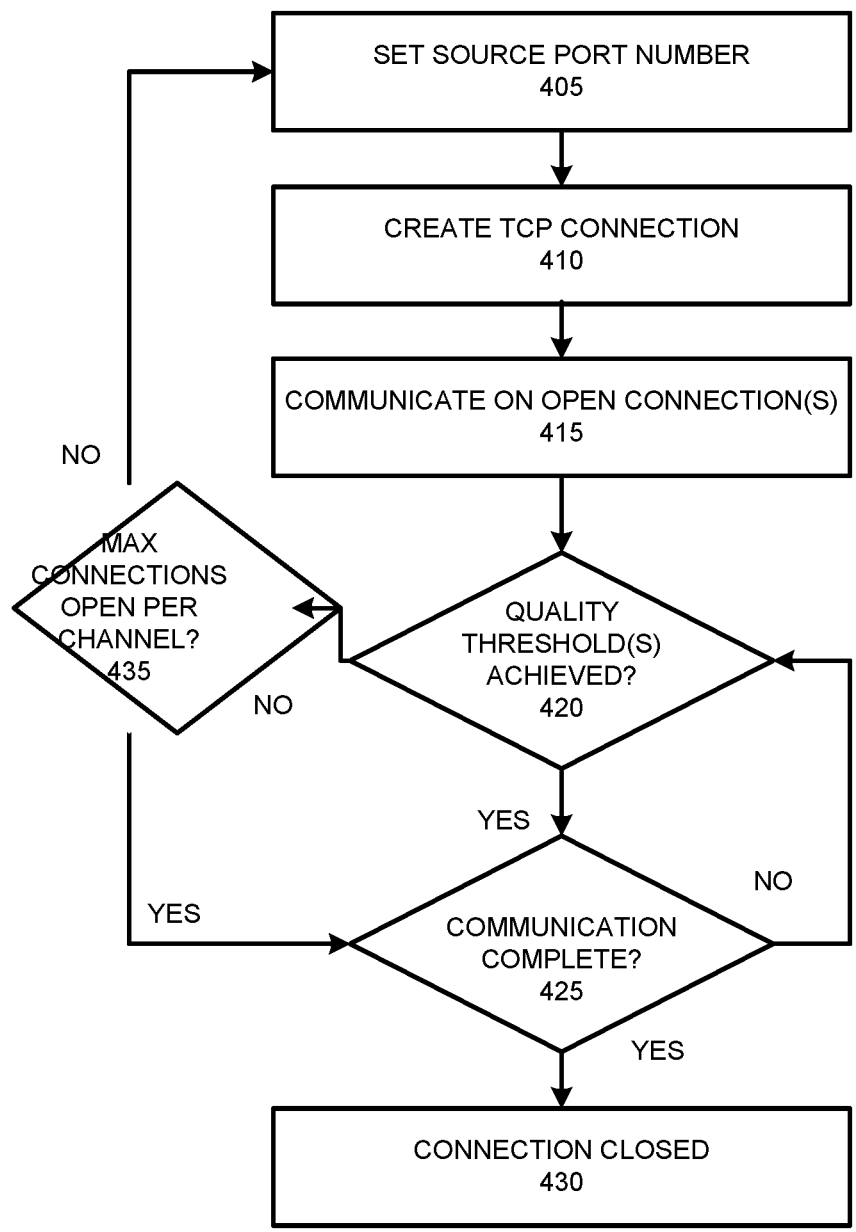
FIG. 4 is a flow chart diagram that illustrates operation of using multiple TCP connection according to an exemplary embodiment of the present invention.

A flowchart diagram that illustrates operation of an exemplary embodiment of the present invention is illustrated in FIG. 4. At operation 405, source port numbers are selected for each respective TCP socket. At operation 410, TCP sockets (which will be used for TCP connections) are created. operation 405 may occur before operation 410 occurs, or, or source ports are assigned at the time that respective TCP sockets are created. At operation 415, and communication occurs between client and server over open TCP connections. At operation 420, the quality of the communication between the client and the server may be evaluated. Exemplary parameters that may be evaluated to determine quality of the communication include delay, latency, jitter, error rate, QoS, etc. any parameter that is evaluated is compared with a corresponding threshold. If the parameters are identified as having passed a threshold (i.e., the parameter indicates that quality levels are not being met), then at optional operation 435 it is determined whether the number of connections currently being used for communication between the client and the server are at a maximum. If the number of connections is not at a maximum value (e.g., 2 TCP connections, 2 TCP connections and 1 UDP connection (3 total), 3 TCP connections and 1 UDP connection (4), etc.), or if optional operation 435 is not included, processing proceeds to operation 405 and 410 to create an additional TCP connection. As each TCP connection is added, if one or more quality thresholds have not been met and as long as there is no maximum number of TCP connections permitted between client and server, additional TCP connections are added. Processing then proceeds to operation 425. At operation 425, if communication between client and server is complete then processing proceeds to operation 430 and all open connections between client and server may be closed (although in some embodiments multiple connections may be kept open pending future communication). If communication is not completed then processing proceeds from operation 425 and back to operation 420.

In a further exemplary embodiment, if communication between the client and the server is ongoing and one or more quality thresholds have been met, one or more of multiple TCP connections may be closed. In a further embodiment, after one or more TCP connections have been closed, one or more attributes can be evaluated again to determine whether quality thresholds have been met, and if quality thresholds have not been met, then one or more TCP connections can be added to one or more TCP connections that are currently being used. The quality thresholds may include a maximum number of lost/dropped packets over a period of time, a latency time period, a jitter time period, and a data rate identified as a number of packets received over a period of time.

Figure 5:
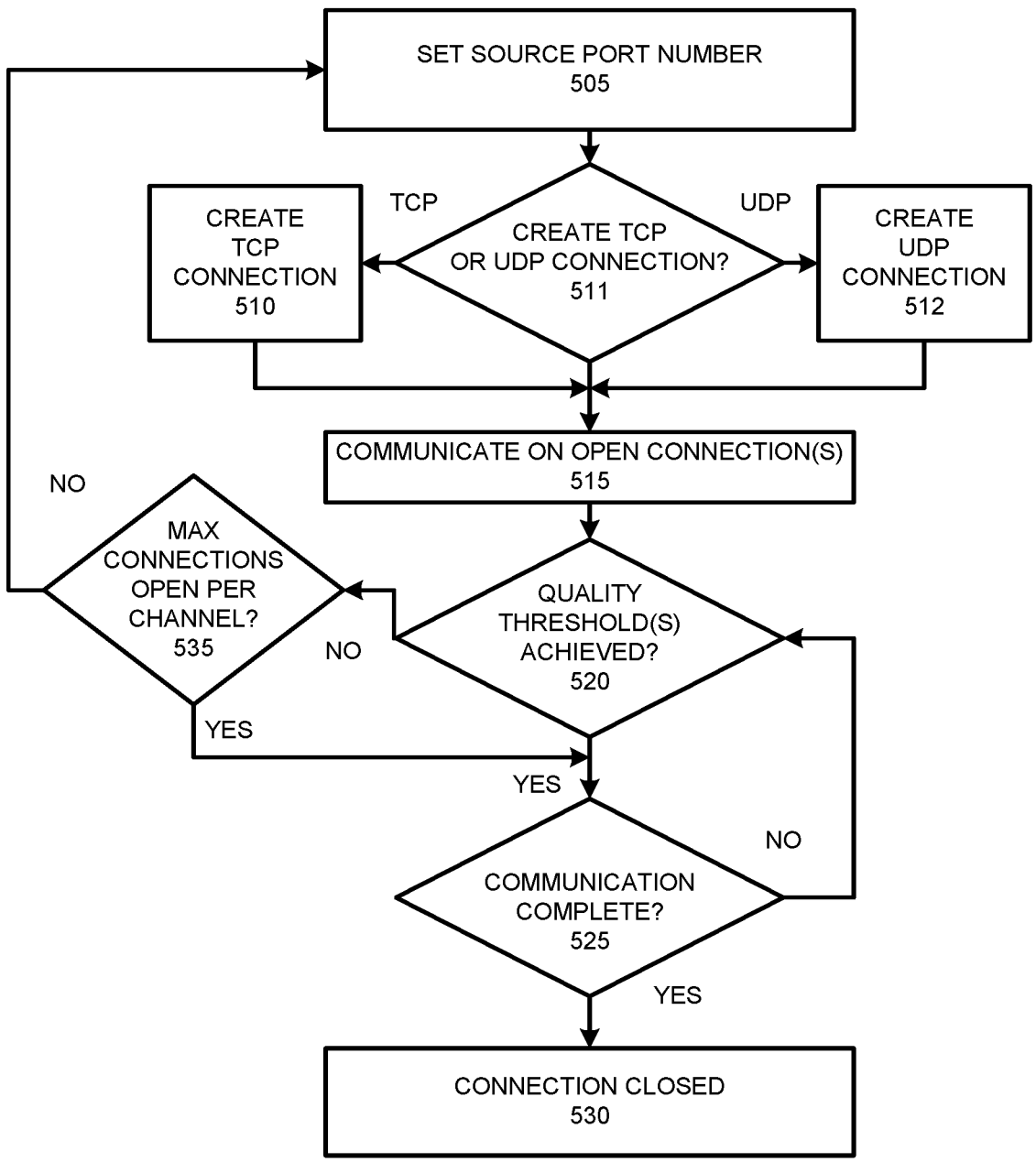
FIG. 5 is a flow chart diagram that illustrates operation of using multiple TCP and/or UDP connections according to an exemplary embodiment of the present invention.

FIG. 5 is a flowchart diagram that illustrates operation of a further exemplary embodiment of the present invention. Many of the operations illustrated in FIG. 5 are analogous to operations illustrated in FIG. 4, such as 505, 515, 520, 525, 535 and 530. FIG. 5 differs from FIG. 4, however, in that FIG. 5 includes operations 511 and 512. While FIG. 4 relates to creating multiple TCP connections, or increasing the number of TCP connections, FIG. 5 relates to creating/increasing not only the number of TCP connections but also creating a UDP connection. Certain types of data transfer may be better suited for transfer over a UDP connection than being transferred over a TCP connection(s). For example, live real-time events (e.g. sporting events) may be more optimal if transmitted via a UDP connection than via a TCP connection. Alternatively, use of a UDP connection may result in better quality of the data transfer between the client and the server. Again, quality may relate to one of multiple parameters including delay, latency, jitter, error, QoS, etc. Thus, FIG. 5 includes the operation of creating a UDP connection 512 which is used concurrently with multiple TCP connections. Whether or not to create a UDP connection may be based on a number of factors. In one example, the UDP connection is merely created on a "try it" basis to see if the UDP connection can maintain one or more quality attributes or thresholds. In another embodiment, characteristics of the data being transmitted may trigger the creation of the UDP connection shown at operation 520. An example would be if data is continuously being transmitted from server to client (instead of being transmitted in spurts) which may indicate live video (such as sporting events) etc. Thus, in some situations a UDP connection may be created at operation 520 and processing proceeds to operation 525 in a manner analogous to operation 415.

According to one example embodiment, when a first TCP connection is established and used to exchange data between a client device and a server, the first TCP connection may be monitored for data network characteristics, such as one or more of packet latency as measured over time, packet exchanged round trip time, packet jitter as measured over time, bandwidth throughput as a data rate achieved over a period of time, packet loss as a number of packets over a period of time, etc. One common TCP connection concern may be, for example, latency. Also, one or more of the network data characteristics may be linked to another and may cause proprietary or default protocol actions which may include, for example, the automated slowing of a data rate or latency (time of one packet) of that first TCP connection. It may not be feasible to identify when the first TCP connection will automatically slow, although detecting the current data rate of the first TCP connection can be a routine process. When the TCP connection is identified as having slowed down from a target data rate or target latency value, an additional TCP connection(s) may be added.

The process of adding additional TCP connections may include adding one TCP connection at a time, detecting a slow down condition of the previously added TCP connection, then adding another TCP connection. Ultimately, there is no limit on the number of TCP connections used during a single data session. The actual limit may be a very large number, such as thousands of connections. The term channel is used to denote the group of one or more connections during a data session. A channel may include connection mirroring, where one set of data is sent via two or more connections as the same data for redundancy, such as to avoid packet loss. A channel may also use bonding where the data sent across multiple connections is different so a total amount of data exchanged can be larger than if only one connection is used. The channel may include multiple ('N') number of TCP connections and/or UDP connections. Bonding and mirroring are generally used when there is more than one different network connection providing independent connections which may be bonded together to forward and receive data as a common bonded channel that uses more than one different network and in turn different network connections.

The decision to add additional TCP connections may be based on a previously added TCP connection being slowed below a threshold data rate and/or latency rate or via a combination of other data network characteristics. Also, when adding the second, third, etc., TCP connections, the client device may be using an application that requires UDP, or another TCP connection or a TCP connection which is operating at a faster rate than the current available rate. This may invoke connection bonding so the channel includes multiple TCP connections. Also, the UDP packet data of a particular UDP application may be detected as it is forwarded via a TCP channel. In this example, the UDP data may be forwarded to a dedicated UDP connection. The UDP connection may be created when the first or second TCP connection is created, and may then remain dormant until the UDP specific application requires the UDP connection. In this example, a first TCP connection is established, a UDP connection is established and a second UDP connection is established when the first TCP connection is not maintaining the network characteristics parameters desired by a target data rate, latency rate, etc.

Additionally, the VPN server 250 may be used to provide data security and data management between the client device and the data server by encrypting the data packets over the TCP and UDP connections. The VPN server 250 may be connected to the client device and the server during the data communication exchange over the 'channel' of connections.

In one example, an application operating on a client device will use a VPN to provide data access to and from remote source (i.e., server), and this may include multiple TCP and/or UDP connections all managed by the same VPN. An application on the client device may create one network connection that is used to pass data through the VPN. The VPN can split the packets received over the network connection into multiple connections. However, there may be multiple TCP/UDP connections managed by the VPN which are available to use on a common network platform. The 'connection' is identified as a single connection or channel and the specific connections used to provide data access remain anonymous or hidden from the application operating on the client device. For example, a single network adapter may be used and the VPN may have its own virtual network adapter or virtual network interface as another individual component providing multiple connections. Additionally, the VPN server may provide data packet management services, such as encryption and other security measures to protect the integrity of data exchanged between client and server.

Figure 6:
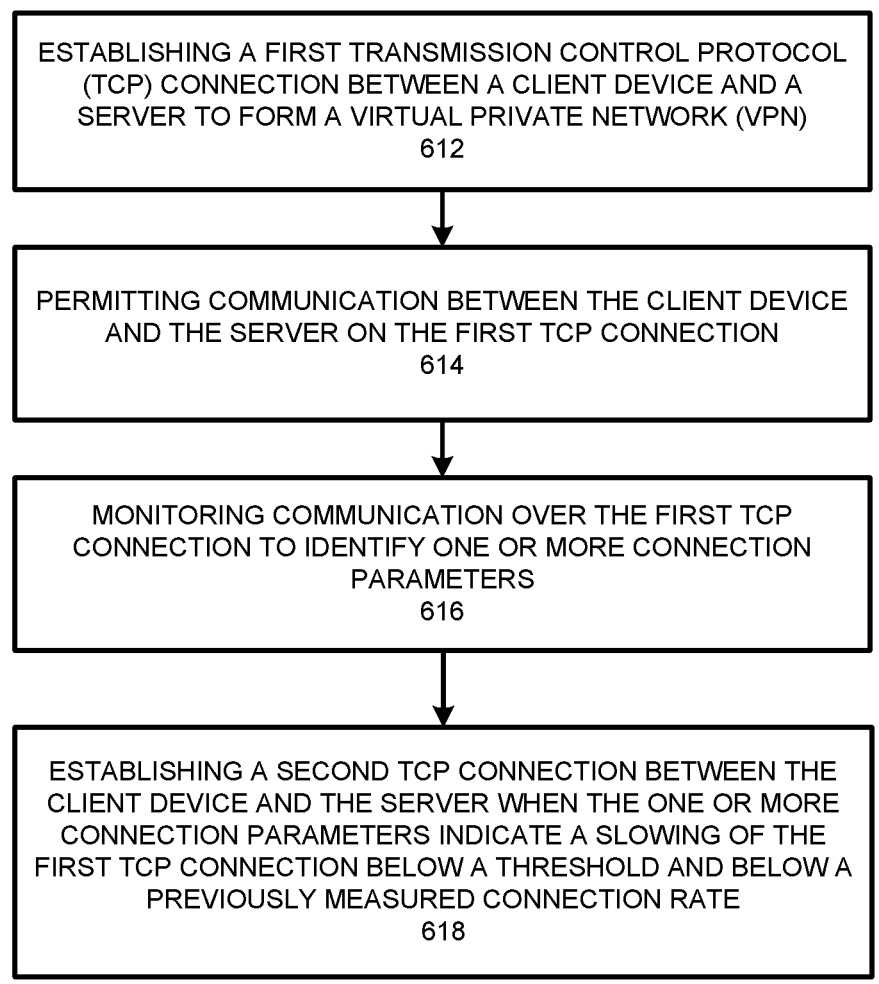
FIG. 6 is a flow chart of an exemplary embodiment of the present invention.

FIG. 6 illustrates an example process 600 of creating multiple connections according to example embodiments. Referring to FIG. 6, the process may include establishing a first transmission control protocol (TCP) connection between a client device and a server to form a virtual private network (VPN) 612, permitting communication between the client device and the server on the first TCP connection 614, monitoring communication over the first TCP connection to identify one or more connection parameters 616, and establishing a second TCP connection between the client device and the server when the one or more connection parameters indicate a slowing of the first TCP connection below a threshold and below a previously measured connection rate 618.

The one or more connection parameters can include one or more of a data rate, an error rate, and a latency value, and the threshold is a data rate threshold, an error rate threshold, or a latency threshold. The previously measured connection rate could be a previously noted data rate, error packet loss rate or some rate that was measured previously, and which is now different. The measuring of rate and threshold(s) may be performed periodically to ensure TCP connection compliance and whether to add new connections in the event that the measurements are not according to one or more expected values. Responsive to establishing the first TCP connection or the second TCP connection, a user datagram protocol (UDP) connection may be established. The process may also include identifying UDP packets created by an application on the client device, forwarding the UDP packets identified from the client device on the UDP connection, and forwarding TCP packets identified from another application on the client device via one or more of the first and second TCP connection.

When an application is using UDP packets for data packaging and transmission, the packets may be forwarded on a UDP connection that is created as a standby connection awaiting UDP packets. The UDP connection may be used as part of a bonded channel that bonds one or more TCP connections with the UDP connection or as a stand-alone channel dedicated for UDP traffic or other types of data traffic. The process may also include determining no UDP packets are being sent by the client device for a period of time, and closing the UDP connection. The UDP connection can be maintained for a period of time and removed when not in use. The process may also include adding at least one third TCP connection, and bonding the first, second and third TCP connections together as a single bonded channel. This may also include additional TCP connections which are added each time a data network condition is not maintained. The process may also include determining the first or second TCP connections has resumed the one or more connection parameters to be above the threshold, and removing one of the three TCP connections. In this example, if a slowed connection or a connection that is maintaining its parameters being monitored, then the connection can be released pending additional monitoring results. The decision to add or remove connections may be based on current connection performance of one or more of the connections.

The above explanation has included examples in which various operations are taken to improve data connections, such as data streaming to a client such as a mobile device. It is understood, however, that the above examples may relate to the streaming of data to other devices such as to a server, or, data exchanges which do not include streaming.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Virtual private network (VPN) device/server may indicate any similar system that encapsulates packets to transmit them to and from a client device and to and from a remote server. For example, a VPN may be a software defined network (SDN) or SD wide area network (SD-WAN), or a multi-path TCP (MPTCP) proxy device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Figure 7:
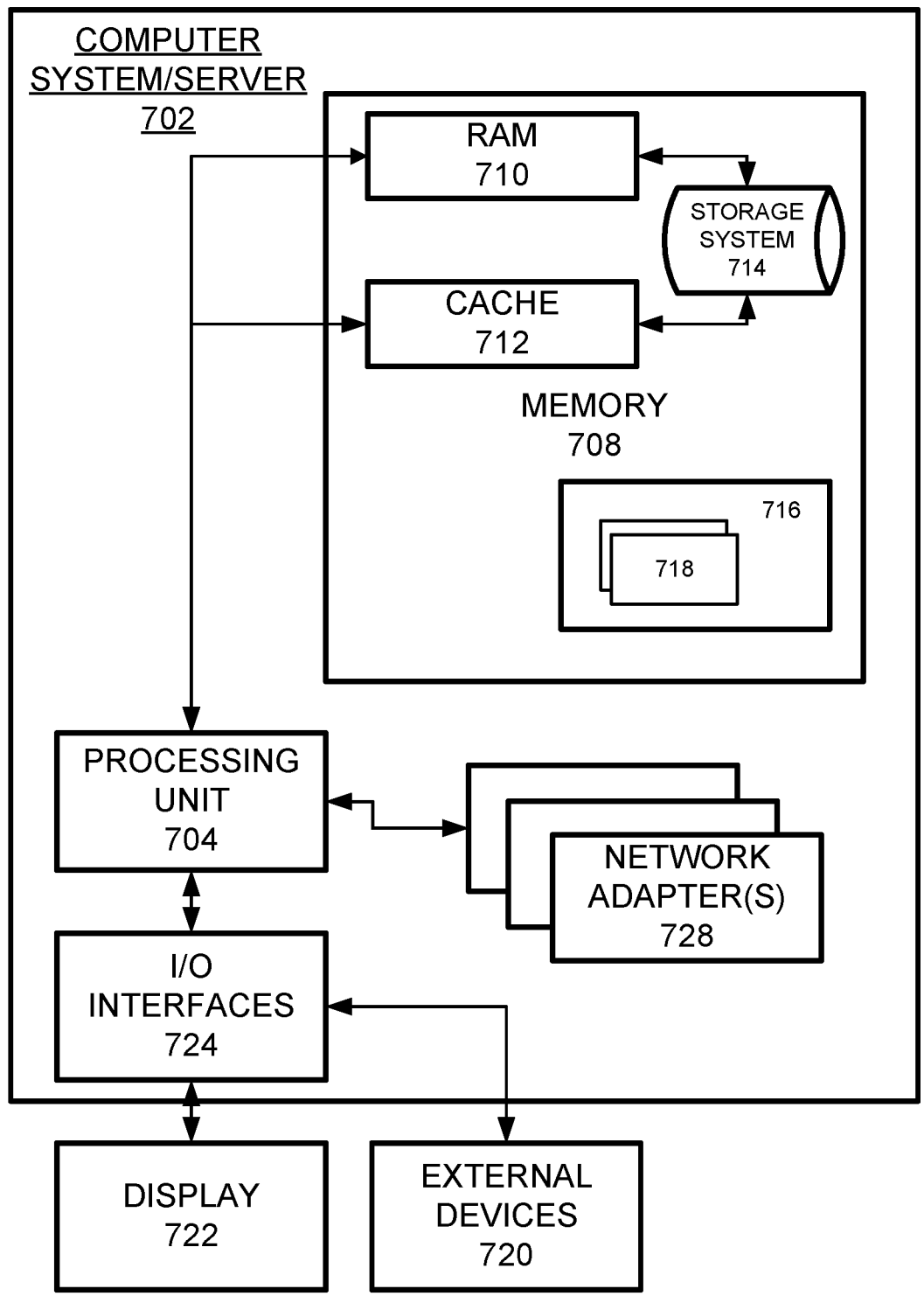
FIG. 7 is a system diagram of a computer system which may be used to support one or more exemplary embodiments of the present application.

FIG. 7 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 7 illustrates an example network entity device configured to store instructions, software, and corresponding hardware for executing the same according to example embodiments. FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 7, computer system/server 702 in cloud computing node 700 is displayed in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter(s) 726. As depicted, network adapter(s) 726 communicates with the other components of computer system/server 702 via a bus. It should be understood that although not displayed, other hardware and/or software components could be used in conjunction with computer system/server 702. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with operations in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:
   establishing a first transmission control protocol (TCP) connection between a client device and a virtual private network (VPN) server;
   permitting communication between the client device and the VPN server on the first TCP connection;
   monitoring, via the VPN server, communication over the first TCP connection to identify one or more connection parameters;
   establishing at least one additional TCP connection to create a plurality of TCP connections between the client device and the VPN server when the one or more connection parameters indicate a slowing of the first TCP connection below a threshold and below a previously measured connection rate;
   determining the one or more connection parameters indicate a slowing of the plurality of TCP connections based on operation of a plurality of applications operating on the client device;
   creating a UDP connection and assigning application data used by one of the plurality of applications operating on the client device to the UDP connection; and
   transmitting and receiving data associated with another application of the plurality of applications used by the client device over the plurality of TCP connections.

2. The method of claim 1, wherein the one or more connection parameters comprise one or more of a data rate, an error rate, and a latency value, and wherein the threshold is a data rate threshold, an error rate threshold, or a latency threshold.

3. The method of claim 1, comprising
   determining no UDP packets are being sent by the client device for a period of time; and
   closing the UDP connection.

4. The method of claim 1, comprising
   adding at least one third TCP connection; and
   bonding the first, second and third TCP connections together as a single bonded channel.

5. The method of claim 4, comprising
   determining the first or second TCP connections has resumed the one or more connection parameters to be above the threshold; and
   removing one of the three TCP connections.

6. A client device comprising:
a processor configured to
  establish a first transmission control protocol (TCP) connection between the client device and a virtual private network (VPN) server;
  permit communication between the client device and the server on the first TCP connection;
  monitor, via the VPN server, communication over the first TCP connection to identify one or more connection parameters;
  establish at least one additional TCP connection to create a plurality of TCP connections between the client device and the VPN server when the one or more connection parameters indicate a slowing of the first TCP connection below a threshold and below a previously measured connection rate;
  determine the one or more connection parameters indicate a slowing of the plurality of TCP connections based on operation of a plurality of applications operating on the client device;
  create a UDP connection and assigning application data used by one of the plurality of applications operating on the client device to the UDP connection; and
  transmit and receive data associated with another application of the plurality of applications used by the client device over the plurality of TCP connections.

7. The client device of claim 6, wherein the one or more connection parameters comprise one or more of a data rate, an error rate, and a latency value, and wherein the threshold is a data rate threshold, an error rate threshold, or a latency threshold.

8. The client device of claim 6, wherein the processor is further configured to
  determine no UDP packets are being sent by the client device for a period of time; and
  close the UDP connection.

9. The client device of claim 6, wherein the processor is further configured to
  add at least one third TCP connection; and
  bond the first, second and third TCP connections together as a single bonded channel.

10. The client device of claim 9, wherein the processor is further configured to
  determine the first or second TCP connections has resumed the one or more connection parameters to be above the threshold; and
  remove one of the three TCP connections.

11. A non-transitory computer readable storage medium configured to store instructions that when executed cause a processor to perform:
  establishing a first transmission control protocol (TCP) connection between a client device and a virtual private network (VPN) server;
  permitting communication between the client device and the VPN server on the first TCP connection;
  monitoring, via the VPN server, communication over the first TCP connection to identify one or more connection parameters;
  establishing at least one additional TCP connection to create a plurality of TCP connections between the client device and the VPN server when the one or more connection parameters indicate a slowing of the first TCP connection below a threshold and below a previously measured connection rate;
  determining the one or more connection parameters indicate a slowing of the plurality of TCP connections based on operation of a plurality of applications operating on the client device;
  creating a UDP connection and assigning application data used by one of the plurality of applications operating on the client device to the UDP connection; and
  transmitting and receiving data associated with another application of the plurality of applications used by the client device over the plurality of TCP connections.

12. The non-transitory computer readable storage medium of claim 11, wherein the one or more connection parameters comprise one or more of a data rate, an error rate, and a latency value, and wherein the threshold is a data rate threshold, an error rate threshold, or a latency threshold.

13. The non-transitory computer readable storage medium of claim 11, wherein the processor is further configured to perform:
  determining no UDP packets are being sent by the client device for a period of time; and
  closing the UDP connection.

14. The non-transitory computer readable storage medium of claim 11, wherein the processor is further configured to perform:
  adding at least one third TCP connection;
  bonding the first, second and third TCP connections together as a single bonded channel;
  determining the first or second TCP connections has resumed the one or more connection parameters to be above the threshold; and
  removing one of the three TCP connections.

* * * * *